(12) United States Patent
Goto et al.

(10) Patent No.: US 8,461,536 B2
(45) Date of Patent: Jun. 11, 2013

(54) RADIATION SCINTILLATOR AND RADIATION IMAGE DETECTOR

(75) Inventors: Narito Goto, Sagamihara (JP); Shigetami Kasai, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 119 days.

(21) Appl. No.: 12/934,061

(22) PCT Filed: Mar. 6, 2009

(86) PCT No.: PCT/JP2009/054292
§ 371 (c)(1),
(2), (4) Date: Sep. 22, 2010

(87) PCT Pub. No.: WO2010/007807
PCT Pub. Date: Jan. 21, 2010

(65) Prior Publication Data
US 2011/0017912 A1    Jan. 27, 2011

(30) Foreign Application Priority Data
Jul. 18, 2008    (JP) .................................. 2008-186829

(51) Int. Cl.
*G01T 1/10*    (2006.01)
(52) U.S. Cl.
USPC ..................................................... 250/361 R
(58) Field of Classification Search
USPC ..................................................... 250/361 R
See application file for complete search history.

(56) References Cited

U.S. PATENT DOCUMENTS

| | | | |
|---|---|---|---|
| 4,039,840 | A | 8/1977 | Shimiya et al. |
| 4,820,926 | A | 4/1989 | Popma et al. |
| 5,811,932 | A | 9/1998 | Colditz et al. |
| 6,469,307 | B2 | 10/2002 | Takabayashi et al. |
| 6,707,050 | B2 | 3/2004 | Hosoi |
| 7,612,342 | B1 * | 11/2009 | Nagarkar ...................... 250/362 |
| 2002/0074502 | A1 | 6/2002 | Takabayashi et al. |
| 2003/0047697 | A1 | 3/2003 | Iwabuchi et al. |
| 2005/0056795 | A1 | 3/2005 | Shibuya et al. |
| 2005/0061992 | A1 | 3/2005 | Kasai et al. |
| 2006/0054830 | A1 | 3/2006 | Oyaizu et al. |

(Continued)

FOREIGN PATENT DOCUMENTS

| | | |
|---|---|---|
| JP | 54-35060 B2 | 10/1973 |
| JP | 63-215987 A | 9/1988 |

(Continued)

OTHER PUBLICATIONS

U.S. Appl. No. 12/934,064, filed Sep. 22, 2010, Confirmation No. 4189.

(Continued)

*Primary Examiner* — Kiho Kim
(74) *Attorney, Agent, or Firm* — Holtz Holtz Goodman & Chick PC

(57) ABSTRACT

Disclosed are a radiation scintillator and a radiation image detector comprising the radiation scintillator. The radiation scintillator which exhibits enhanced sharpness and luminance and is excellent in shock resistance, comprises, on the substrate, a scintillator layer containing a phosphor and formed by a process of gas phase deposition, and the scintillator layer exhibits a thickness of 100 to 500 μm, a filling factor of the phosphor of 75 to 90% by mass and a layer thickness distribution of not more than 20%.

14 Claims, 3 Drawing Sheets

U.S. PATENT DOCUMENTS

| | | |
|---|---|---|
| 2007/0051896 A1 | 3/2007 | Okada et al. |
| 2007/0075270 A1 | 4/2007 | Leblans et al. |
| 2008/0035852 A1 | 2/2008 | Nagata et al. |
| 2008/0083877 A1 | 4/2008 | Nomura et al. |
| 2008/0093558 A1 | 4/2008 | Shoji et al. |
| 2008/0099687 A1 | 5/2008 | Shoji et al. |
| 2008/0099694 A1 | 5/2008 | Shoji et al. |
| 2008/0217550 A1 | 9/2008 | Shoji et al. |
| 2009/0261274 A1 | 10/2009 | Sakurai et al. |
| 2010/0092769 A1 | 4/2010 | Shoji et al. |
| 2010/0116992 A1 | 5/2010 | Kudo et al. |
| 2010/0314547 A1 | 12/2010 | Kudo et al. |
| 2011/0017913 A1 | 1/2011 | Kasai et al. |

FOREIGN PATENT DOCUMENTS

| | | |
|---|---|---|
| JP | 6-100856 A | 4/1994 |
| JP | 2000-284053 A | 10/2000 |
| JP | 2002-116258 A | 4/2002 |
| JP | 2002-214397 A | 7/2002 |
| JP | 2004-071434 A | 3/2004 |
| JP | 2005-091140 A | 4/2005 |
| JP | 2005-098717 A | 4/2005 |
| JP | 2005091143 A * | 4/2005 |
| JP | 2006-058099 A | 3/2006 |
| JP | 2007-041008 A | 2/2007 |

OTHER PUBLICATIONS

Japanese Office Action mailed Oct. 30, 2012, which issued in the counterpart Japanese Patent Application 2010-520791, and an English-language translation thereof.

* cited by examiner

RADIATION SCINTILLATOR AND RADIATION IMAGE DETECTOR

This application is the United States national phase application of International Application PCT/JP2009/054292 filed Mar. 6, 2009.

TECHNICAL FIELD

The present invention relates to a radiation scintillator capable of converting radiation to visible light and a radiation image detector by use of the radiation scintillator.

TECHNICAL BACKGROUND

There have been broadly employed radiographic images such as X-ray images for diagnosis of the conditions of patients on the wards. Specifically, radiographic images using an intensifying-screen/film system have achieved enhancement of speed and image quality over its long history and are still used on the scene of medical treatment as an imaging system having high reliability and superior cost performance in combination. However, these image data are so-called analog image data, in which free image processing or instantaneous image transfer cannot be realized.

Recently, there appeared digital system radiographic image detection apparatuses, as typified by a computed radiography (also denoted simply as CR) and a flat panel detector (also denoted simply as FPD). In these apparatuses, digital radiographic images are obtained directly and can be displayed on an image display apparatus such as a cathode ray tube or liquid crystal panels, which renders it unnecessary to form images on photographic film. Accordingly, digital system radiographic image detection apparatuses have resulted in reduced necessities of image formation by a silver salt photographic system and leading to drastic improvement in convenience for diagnosis in hospitals or medical clinics.

The computed radiography (CR) as one of the digital technologies for radiographic imaging has been accepted mainly at medical sites. However, image sharpness is insufficient and spatial resolution is also insufficient, which have not yet reached the image quality level of the conventional screen/film system. Further, there appeared, as a digital X-ray imaging technology, an X-ray flat panel detector (FPD) using a thin film transistor (TFT), as described in, for example, non-patent documents 1 and 2.

To convert radiation to visible light is employed a scintillator panel made of an X-ray phosphor which is emissive for radiation. The use of a scintillator panel exhibiting enhanced emission efficiency is necessary for enhancement of the SN ratio in radiography at a relatively low dose. Generally, the emission efficiency of a scintillator panel depends of the scintillator layer (phosphor layer) thickness and X-ray absorbance of the phosphor. A thicker phosphor layer causes more scattering of emission within the phosphor layer, leading to deteriorated sharpness. Accordingly, necessary sharpness for desired image quality level necessarily determines the layer thickness.

Specifically, cesium iodide (CsI) exhibits a relatively high conversion rate of X-rays to visible light. Further, a columnar crystal structure of the phosphor can readily be formed through vapor deposition and its light guide effect inhibits scattering of emitted light within the crystal, enabling an increase of the phosphor layer thickness.

However, the use of CsI alone results in reduced emission efficiency. For example, there was disclosed a technique for use as an X-ray phosphor in which a mixture of CsI and sodium iodide (NaI) at any mixing ratio was deposited on a substrate to form sodium-activated cesium iodide (CsI:Na), which was further subjected to annealing as a post-treatment to achieve enhanced visible-conversion efficiency (as described in patent document 1).

There were also disclosed a technique in which a scintillator layer thickness of not less than 500 μm and a filling factor of columnar crystals in a scintillator layer of 70 to 80% achieved enhanced image resolution and high image quality without vitiating X-ray transmittance (as described in, for example, patent document 2); a technique in which a phosphor layer thickness of 300 to 700 μm and its relative density of 85 to 97% achieved enhanced sensitivity and sharpness (as described in, for example, patent document 3; and a technique in which reduction of layer thickness distribution or a coefficient of variation of layer thickness in a phosphor layer achieved reduced unevenness of sensitivity (as described in, for example, patent document 4).

Patent document 1: JP 54-35060B
Patent document 2: JP 2006-058099A
Patent document 3: JP 2002-214397A
Patent document 4: JP 2005-091140A
Non-patent document 1: the article, "Amorphous Semiconductor Usher in Digital X-ray Imaging" in Physics Today, November, 1997, page 24, and
Non-patent document 2: the article, "Development of a High Resolution, Active Matrix, Flat-Panel Imager with Enhanced Fill Factor" described in SPIE, vol. 32, page 2 (1997).

DISCLOSURE OF INVENTION

Problems to be Solved

However, in a plat plane radiation image detector (hereinafter, also denoted simply as FPD) with a large screen, specifically in cases when high sharpness for use in mammography is required, sufficient characteristics were not achieved even by use of the prior art. Further, enhanced durability resistant to shock in handling is required in a portable FPD of a cassette type, in which sufficient characteristics were not attained by the prior art. In view of the foregoing circumstances, the present invention has come into being and it is an object of the invention to provide a radiation scintillator with enhanced sharpness and luminance and excellent shock resistance, and a radiation image detector by use thereof.

Means for Solving the Problems

The foregoing problems in the invention can be solved by the following means.

1. A radiation scintillator, wherein the radiation scintillator comprises, on a substrate, a scintillator layer containing a phosphor and formed by a process of gas phase deposition, and the scintillator layer exhibits a thickness of 100 to 500 μm, a filling factor of the phosphor of 75 to 90% by mass and a layer thickness distribution of not more than 20%.

2. A radiation scintillator, wherein the radiation scintillator comprises, on a substrate, a scintillator layer containing a phosphor, formed by a process of gas phase deposition, and the scintillator layer exhibits a thickness of 100 to 500 μm, a filling factor of the phosphor of 75 to 90% by mass and a coefficient of variation of thickness of not more than 20%.

3. The radiation scintillator as described in the foregoing 1 or 2, wherein the phosphor is a cesium halide phosphor.

4. The radiation scintillator as described in any of the foregoing 1 to 3, wherein the phosphor contains a thallium activator.

5. A radiation image detector comprising an input means for converting a radiation to a visible light by a radiation scintillator, as described in any of the foregoing 1 to 4 and an output means for outputting image information based on the visible light converted by the radiation scintillator.

EFFECT OF THE INVENTION

The present invention can provide a radiation image detector with enhanced luminance and sharpness and excellent shock resistance.

Figure 1:
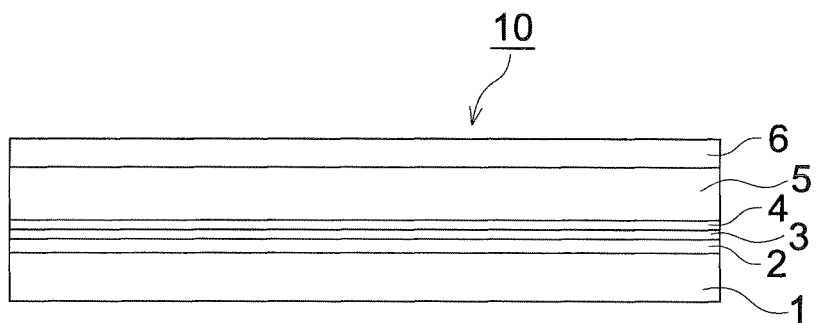
FIG. 1 illustrates a sectional view showing a constitution of a radiation scintillator (1).

| DESCRIPTION OF DESIGNATION | |
|---|---|
| 1: | Substrate |
| 2: | Intermediate layer |
| 3: | Reflection layer |
| 4: | Protective layer |
| 5: | Scintillator layer |
| 6: | Moisture-resistant protective layer |
| 10: | Radiation scintillator |
| 61: | Evaporation device |
| 62: | Vacuum vessel |
| 63a, 63b: | Evaporation source (filled member) |
| 64: | Holder |
| 65: | Rotation mechanism |
| 66: | Vacuum pump |
| 67: | Support rotation shaft |
| 68: | Shutter |
| 100: | Radiation image detector |

PREFERRED EMBODIMENTS OF THE INVENTION

Scintillator Layer:

A scintillator layer (also called a phosphor layer) is a layer which comprises a scintillator emitting fluorescence upon exposure to radiation.

Namely, the scintillator refers to a phosphor emitting an electromagnetic wave with a wavelength of 300 to 800 nm, that is, an electromagnetic wave of from ultraviolet light to an infrared light, centering around visible light.

In the invention, the thickness of a scintillator layer is preferably from 100 to 500 μm, more preferably from 120 to 470 μm, and still more preferably from 140 to 450 μm. The filling factor of a scintillator layer is preferably from 75 to 90% (that is % by mass, hereinafter is also the same), more preferably from 77 to 88%, and still more preferably from 79 to 85% by mass. The filling factor refers to a value of the actual mass of the scintillator layer, divided by a theoretical density and an apparent volume. Controlling the filling factor of a scintillator layer can be achieved by controlling the substrate temperature at the time of vapor deposition or by controlling the degree of vacuum through control of the deposition rate or adjustment of the introducing amount of carrier gas such as Ar or the like.

A scintillator layer thickness of 100 to 500 μm, a filling factor of 75 to 90% and a thickness distribution of the scintillator layer of not more than 20% can achieve enhancements of not only luminance and sharpness but also shock resistance. Further, a scintillator layer thickness of 100 to 500 μm, a filling factor of 75 to 90% and a coefficient of variation in a thickness distribution of the scintillator layer of not more than 20% can also achieve enhancements of shock resistance in addition to luminance and sharpness.

The layer thickness distribution is preferably not more than 10% and more preferably not more than 5%. A lesser layer thickness distribution is more preferred but it is usually not less than 0.1%. The coefficient of variation of layer thickness is preferably not more than 10% and more preferably not more than 5%. A lesser coefficient of variation of layer thickness is more preferred but it is usually not less than 0.1%.

The layer thickness distribution is a guideline value indicating the extent of variation in a phosphor layer thickness in the phosphor layer. The layer thickness distribution is a value obtained by the following equation (1):

$$\text{Layer thickness distribution} = [(D_{max} - D_{min})/(D_{max} + D_{min})] \times 100 (\%) \quad \text{Equation (1)}$$

wherein, when a phosphor layer is horizontally and vertically divided into ten, respectively, on the radiation scintillator and the phosphor layer thickness is measured at the center of the respective 100 portions, $D_{max}$ and $D_{min}$ are a maximum thickness and a minimum thickness, respectively.

Coefficient of Variation:

The coefficient of variation is also a guideline value indication the extent of variation in a phosphor layer thickness in the phosphor layer similarly to the foregoing layer thickness distribution. The coefficient of variation is a value obtained by the following equation (2):

$$\text{Coefficient of variation} = D_{dev}/D_{av} (\%) \quad \text{Equation (2)}$$

wherein, similarly to the layer thickness distribution, when a phosphor layer is divided to ten horizontally and vertically on the radiation scintillator and the phosphor layer thickness is measured at the center of the respective 100 portions, $D_{av}$ is an average layer thickness of the respective measurement points (average value of measurements of five times) and $D_{dev}$ is a standard deviation of the average layer thickness.

A material to form a scintillator layer may employ a variety of commonly known phosphor materials, of which a cesium halide is preferred and cesium iodide (CsI) is specifically preferred since it exhibits an enhanced conversion rate of X-rays to visible light and readily forms a columnar crystal structure of a phosphor, whereby scattering of emitted light within the crystal is inhibited through the light guide effect, rendering it feasible to increase the scintillator layer thickness.

CsI exhibits, by itself, a relatively low emission efficiency so that various activators are incorporated. For example, JP-B No. 54-35060 disclosed a mixture of CsI and sodium iodide (NaI) at any mixing ratio. Further, as disclosed in JP 2001-059899A, vapor deposition of CsI containing an activator, such as indium (In), thallium (Tl), lithium (Ii), potassium (K), rubidium (Ru) or sodium (Na). In the present invention, thallium (Tl) is preferred.

In the invention, it is preferred to employ an additive containing at least one thallium compound and cesium iodide, as raw materials to form a scintillator layer of Tl-containing CsI. Thus, thallium-activated cesium iodide (denoted as CsI:Tl), which exhibits a broad emission wavelength of from 400 to 750 nm, is preferred.

There can be employed various thallium compounds (compound having an oxidation number of +I or +III) as a thallium compound contained in such an additive.

Preferred examples of thallium compounds include thallium bromide (TlBr), thallium chloride (TlCl), and thallium fluoride (TlF, $TlF_3$).

The melting point of a thallium compound is preferably in the range of 400 to 700° C. in terms of emission efficiency. In the invention, the melting point is one under ordinary temperature and ordinary pressure.

The molecular weight of a thallium compound is preferably in the range of from 206 to 300.

In the scintillator layer of the present invention, the content of an additive, as described above is desirably optimized in accordance with its object or performance but is preferably from 0.001 to 50 mol % of cesium iodide, and more preferably from 0.1 to 10.0 mol %.

The radiation scintillator of the invention may be employed as a radiation image detector, wherein a scintillator layer is provided by a gas phase deposition process on the first substrate through a reflection layer or a protective layer and is adhered to or is closely brought into contact with a photoelectric conversion panel forming a photoelectric conversion element section in which picture elements comprised of a photosensor and a TFT are two-dimensionally formed on the second substrate. Alternatively, it may be employed as a radiation image detector, wherein a photoelectric conversion element section in which picture elements comprised of a photosensor and a TFT are two-dimensionally formed on the second substrate and then, a scintillator layer is provided directly or through a protective layer by a process of vapor deposition.

Protective Layer:

The radiation scintillator of the invention preferably comprises a reflection layer provided on the substrate and a protective layer provided on the reflection layer. To achieve sufficient storage characteristics and inhibition of light scattering, the thickness of the protective layer is preferably from 0.2 to 5.0 µm, more preferably from 0.5 to 4.0 µm, and still more preferably from 0.7 to 3.5 µm.

A protective layer preferably employs an organic resin. Specific examples of such an organic resin include a polyurethane, vinyl chloride copolymer, poly[(vinyl chloride)-co-(vinyl acetate)], poly[(vinyl chloride)-co-(vinylidene chloride)], poly[(vinyl chloride)-co-acrylonitrile], poly(butadiene-co-acrylonitrile), polyvinyl acetal, polyester, cellulose derivatives (e.g., nitrocellulose), polyimide, polyamide, poly-p-xylylene, poly(styrene-co-butadiene), various synthetic rubber resins, phenol resin, epoxy resin, urea resin, melamine resin, phenoxy resin, silicone resin, acryl resin and urea formamide resin.

Of these, it is preferred to employ a polyurethane, polyester, vinyl chloride copolymer, poly(vinyl butyral), nitrocellulose, polyimide or poly-p-xylylene.

Usually, formation of a scintillator by vapor deposition is carried out at a substrate temperature of 150 to 250° C. and a protective layer effectively functions as an adhesion layer by containing an organic resin exhibiting a glass transition temperature from −20 to 45° C. in a protective layer.

Examples of a solvent used for the protective layer include a lower alcohol such as methanol, ethanol, n-propanol or n-butanol; a chlorine-containing hydrocarbon such as methylene chloride or ethylene chloride; a ketone such as acetone, methyl ethyl ketone or methyl isobutyl ketone; an aromatic compound such as toluene, benzene, cyclohexane, cyclohexanone or xylene; an ester of a lower carboxylic acid and a lower alcohol, such as methyl acetate, ethyl acetate or butyl acetate; an ether such as dioxane, ethylene glycol monoethyl ester, or ethylene glycol monomethyl ester; and an ether such as dioxane, ethylene glycol monoethyl ester, or ethylene glycol monomethyl ester.

The protective layer of the invention preferably is a light-absorbing layer and its absorption peak wavelength is preferably from 560 to 650 nm. The protective layer preferably contains at least one of a pigment and a dye so that the absorption peak wavelength falls within the range of 560 to 650 nm.

The protective layer preferably contains a dispersing agent or the like in addition to the foregoing organic resin. A colorant having an absorption peak wavelength within the range of 560 to 650 nm may employ a commercially available one or one which is described in various literature.

A colorant having absorption within the wavelength region of 560 to 650 nm is preferable and a violet to blue, organic or inorganic colorant is preferably used.

Examples of a violet to blue, organic colorant include dioxazine (violet) and phthalocyanine blue or indanthrene blue (blue). Specific examples thereof include Zapon Fast Blue 3G (produced by Hoechst Co.), Estrol Bril Blue N-3RL (produced by Sumitomo Kagaku Co., Ltd.), Sumi Amyl Blue F-GSL (produced by Sumitomo Kagaku Co., Ltd.), Estrol Bril Blue N-3RL (produced by Sumitomo Kagaku Co., Ltd.), D & C Blue No. 1 (National Aniline Co.), Spirit Blue (produced by HODOGAYA KAGAKU Co., Ltd.), Oil Blue No. 603 (Produced by Orient Co.), Kiton Blue A (produced by Ciba Geigy Co.), Eisen Cation Blue GLH (produced by HODOGAYA KAGAKU Co., Ltd.), Lake Blue AFH (produced by KYOWA SANGYO Co., Ltd.), Primocyanine 6GX (produced by Inahata Sangyo Co., Ltd.), Brilacid Green 6BH (produced by HODOGAYA KAGAKU Co., Ltd.), Cyanibe Blue BNRS (produced by Toyo Ink Co., Ltd.) and Lyonoyl Blue SL (Produced by Toyo Ink Co., Ltd.).

Specific examples of inorganic colorants of violet-blue-bluish green include cobalt blue, celurean blue, chromium oxide and $TiO_2$—ZnO—Co—NiO type pigments.

Preferred colorants are metal phthalocyanine pigments.

Preferred examples of a metal phthalocyanine pigment include copper phthalocyanine pigment. So far as the absorption peak wavelength falls within the range of 570 to 650 nm, there may be used phthalocyanine pigments containing other metals, such a zinc, cobalt, iron, nickel, or the like.

A suitable phthalocyanine pigment may be unsubstituted or substituted (by substituents such as an alkyl, an alkoxy, a halogen (e.g., chlorine) or other typical substituents). Crude phthalocyanine can be produced by any of the methods known in the art but preferably by allowing phthalic acid anhydride, phthalonitrile or their derivatives to react with a metal donor, a nitrogen donor (for example, urea or phthalonitrile) and optionally in the presence of a catalyst.

It can be referred to, for example, W. Herbst and K Hunger "Industrial Organic Pigment" (published by VCH publisher, New York, 1993), pages 418-427; H. Zollinger "Colorant chemistry" (VCH publisher, 1973) pages 101-104; "Phthalocyanine Pigment in N. M. Pigelow and M. A. Perkins, edited by Lubs "Chemistry of Synthetic Dye and Pigment" (published by Robert E. Krieger Publisher. 1955) pages 584-587; U.S. Pat. Nos. 4,158,572, 4,257,951 and 5,175,282; and British Patent No. 1502884.

Preferably, a pigment is dispersed in the foregoing organic resin. There can be used various dispersing agents, depending on the organic resin and the pigment used therein.

Examples of such a dispersing agent include phthalic acid, stearic acid, capronic acid and hydrophobic surfactants.

Methods for dispersing a pigment in an organic resin can employ commonly known dispersion techniques used in ink production or toner production. Examples of a dispersing machine include a sand mill, an atreiter, a pearl mill, a super-mill, a ball mill, an impeller, a disperser, a KD mill, a colloid mill, a dynatron, a three-shaft mill, and a pressure kneader. Details are described in, for example, "Saishin Ganryo Oyogijutsu (New Application Technique of Pigment)" (CMC publisher, 1986).

A protective layer is formed by coating a resin dissolved in a solvent and being dried, or by a CVD process.

Substrate:

A substrate related to the invention is a planar body which is capable of transmitting radiation and supporting a scintillator layer and can employ various kinds of glasses, polymeric materials and metals.

There can be employed, for example, plate glass such as quartz, borate glass or chemically reinforced glass; a ceramic substrate such sapphire, silicon nitride or silicon carbide; a semiconductor substrate such as silicon, germanium, gallium arsenide, gallium phosphide or gallium nitride; polymer film (or plastic film) such as cellulose acetate film, polyester film, polyethylene terephthalate polyamide film, polyimide film, triacetate film, polycarbonate film or carbon fiber reinforced resin; and a metal sheet such as aluminum sheet, iron sheet or copper sheet, or a metal sheet of an oxide of the foregoing metal.

A polymer film comprising polyimide or polyethylene naphthalate is specifically suitable when forming a columnar scintillator by a gas phase process by using cesium iodide as a raw material.

Specifically, the substrate preferably is a 50-500 μm thick, flexible polymer film. Herein, the flexible substrate refers to a substrate exhibiting an elastic modulus at 120° C. (also denoted as E120) of 1000 to 6000 N/mm². Such a substrate preferably is a polymer film containing polyimide or polyethylene terephthalate.

In the region showing a linear relationship between strain and corresponding stress which is measured by using a tensile strength tester based on JIS C 2318, the elastic modulus is calculated as the slope of the straight portion of the stress-strain curve, that is, a strain divided by a stress. It is also referred to as a Young's modulus. In the invention, such a Young's modulus is also defined as the elastic modulus.

The substrate used in the invention preferably exhibits an elastic modulus at 120° C. (E120) of 1000 to 6000 N/mm², and more preferably 1200 to 5000 N/mm².

Specific examples include polymer film comprised of polyethylene naphthalate (E120=4100 N/mm²), polyethylene terephthalate (E120=1500 N/mm²), polybutylene naphthalate (E120=1600 N/mm²), polycarbonate (E120=1700 N/mm²), syndiotactic polystyrene (E120=2200 N/mm²), polyether imide (E120=1900 N/mm²), polyacrylate (E120=1700 N/mm²), polysulfone (E120=1800 N/mm²) or polyether sulfone (E120=1700 N/mm²).

These may be used singly or mixedly, or laminated. Of these polymer films, a polymer film comprising polyimide or polyethylene naphthalate is preferred.

Reflection Layer:

A reflection layer reflects emission from a scintillator of a scintillator layer to achieve enhanced light-extraction efficiency. The reflection layer is preferably formed of a material containing any one of the element group of Al, Ag, Cr, Cu, Ni, Ti, Mg, Rh, Pt and Au. It is specifically preferred to use a metal thin film composed of the foregoing element, for example, Ag film or Al film. Such a metal thin-film may be formed of two or more layers. In cases when a metal thin-film is formed of two or more layers, the lower layer preferably contains Cr in terms of enhanced adhesion to the substrate. Further, there may be provided a layer composed of a metal oxide such as $SiO_2$ or $TiO_2$ on the metal thin-layer to achieve enhanced reflectance.

A reflection layer reflects emission from a scintillator layer and also transmits radiation. In one preferred embodiment, the reflection layer related to the invention is a metallic thin-layer capable of transmitting radiation and reflecting a prescribed light (emission from a scintillator).

The thickness of the reflection layer preferably is from 0.005 to 0.3 μm, and more preferably from 0.01 to 0.2 μm in terms of emission-extracting efficiency.

Intermediate Layer:

In the invention, there may be provided an intermediate layer between the substrate and a protective layer. The intermediate layer preferably is a resin-containing layer. Specific examples of such a resin include polyurethane, vinyl chloride copolymer, polyvinyl butyral copolymer, vinyl chloride/vinyl acetate copolymer, vinyl chloride/vinylidene chloride copolymer, vinyl chloride/acrylonitrile copolymer, butadiene/acrylonitrile copolymer, polyamide resin, polyvinyl acetal, polyester, cellulose derivatives (e.g., nitrocellulose), polyimide, polyamide, poly-p-xylirene, styrene/butadiene copolymer, various kinds of synthetic rubber type resins, phenol resin, epoxy resin, urea resin, melamine resin, phenoxy resin, silicone resin, acryl resin and urea-formamide resin. Of these are preferred polyurethane, polyester, vinyl chloride type copolymer, polyvinyl butyral, nitrocellulose, polyimide and poly-p-xylylene.

The thickness of an intermediate layer preferably is from 1.0 to 30 μm, more preferably from 2.0 to 25 μm, and still more preferably from 5.0 to 20 μm.

Moisture-resistant Protective Layer:

A moisture-resistance protective layer related to the invention mainly aims to protect a scintillator layer and a radiation scintillator layer is preferably provided with a moisture-resistant layer. Namely, cesium iodide (CsI) is a hygroscopic material, and absorbs moisture from the atmosphere to deliquesce so that it is a main aim to inhibit this.

The moisture-resistant protective layer can be formed by use of various materials. For instance, it is to form a p-xylylene membrane by a CVD process. Namely, it is to form a p-xylylene layer on all of the surfaces of a scintillator and a substrate, where a protective layer is formed.

Such a moisture-resistant protective layer may be formed in such a manner that a coating solution of a moisture-resistant protective layer is directly coated on the phosphor layer surface or a previously formed moisture-resistant protective film is adhered to or surrounds the phosphor layer to be shielded.

Alternatively, a moisture-resistance protective layer may be formed by depositing an inorganic substance such as SiC, $SiO_2$, SiN, or $Al_2O_3$ by a sputtering process.

Taking into account formability of thickness of the moisture-resistant protective layer, formability of airspace, protectiveness of scintillator (phosphor) layer, sharpness, moisture-resistance and workability, the thickness of the foregoing moisture-resistant protective layer preferably is not less than 12 μm and not more than 100 μm, and more preferably not less than 20 μm and not more than 60 μm.

Further, taking into account sharpness, unevenness of radiation image, production stability and workability, the haze ratio is preferably not less than 3% and not more than 40%, and more preferably not less than 3% and not more than 10%. The haze ratio is referred to a value determined in NDH 5000W, produced by Nippon Denshoku Kogyo Co., Ltd. A necessary haze ratio is readily attained by appropriate choice of commercially available polymeric films.

Taking into account photoelectric conversion efficiency and scintillator emission wavelength, the light transmittance of the moisture-resistant protective layer is preferably not less than 70% at 550 nm; however, a film with light transmittance of 99% or more is not commercially available, so that it is substantially preferred to be from 70 to 99%.

Taking into account protectiveness and deliquescence of a scintillator layer, the moisture permeability of the moisture-resistance protective layer is preferably not more than 50 g/m$^2$ day (40° C., 90% RH, measured in accordance with JIS Z 0208) and more preferably not more than 10 g/m$^2$ day (40° C., 90% RH, measured in accordance with JIS Z 0208); however, a film of not more than 0.01 g/m$^2$ day (40° C., 90% RH) is not commercially available, so that it is substantially preferred to be not less than 0.01 g/m$^2$-day (40° C., 90% RH) and not more than 50 g/m$^2$ day (40° C., 90% RH, measured in accordance with JIS Z 0208), and it is more preferred to be not less than 0.1 g/m$^2$-day (40° C., 90% RH) and not more than 10 g/m$^2$ day (40° C., 90% RH, measured in accordance with JIS Z 0208).

Figure 2:
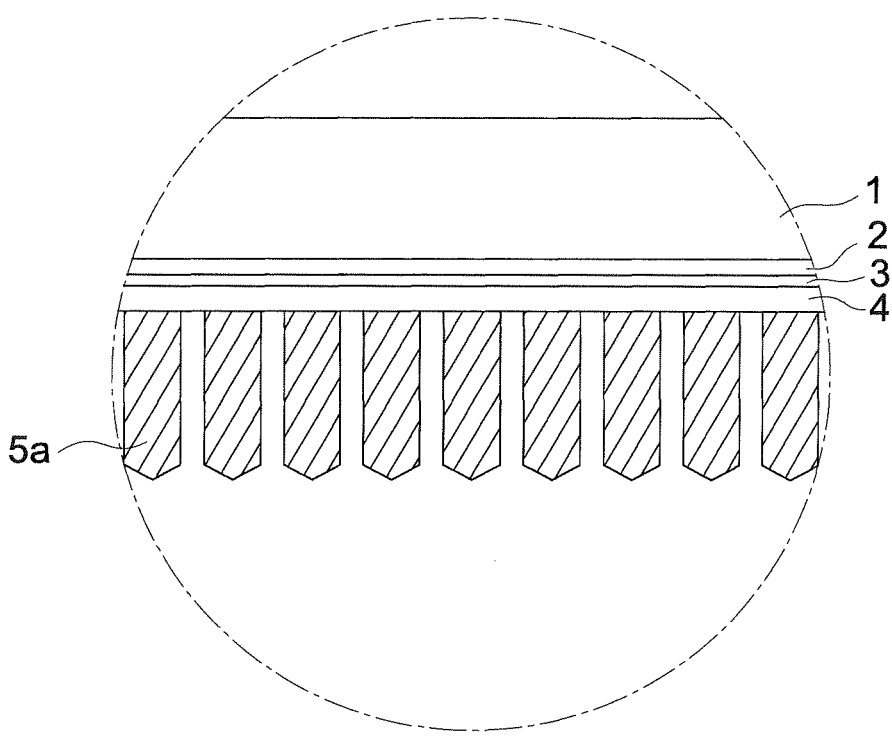
FIG. 2 illustrates an enlarged sectional view showing a part of the radiation scintillator (10).
Figure 3:
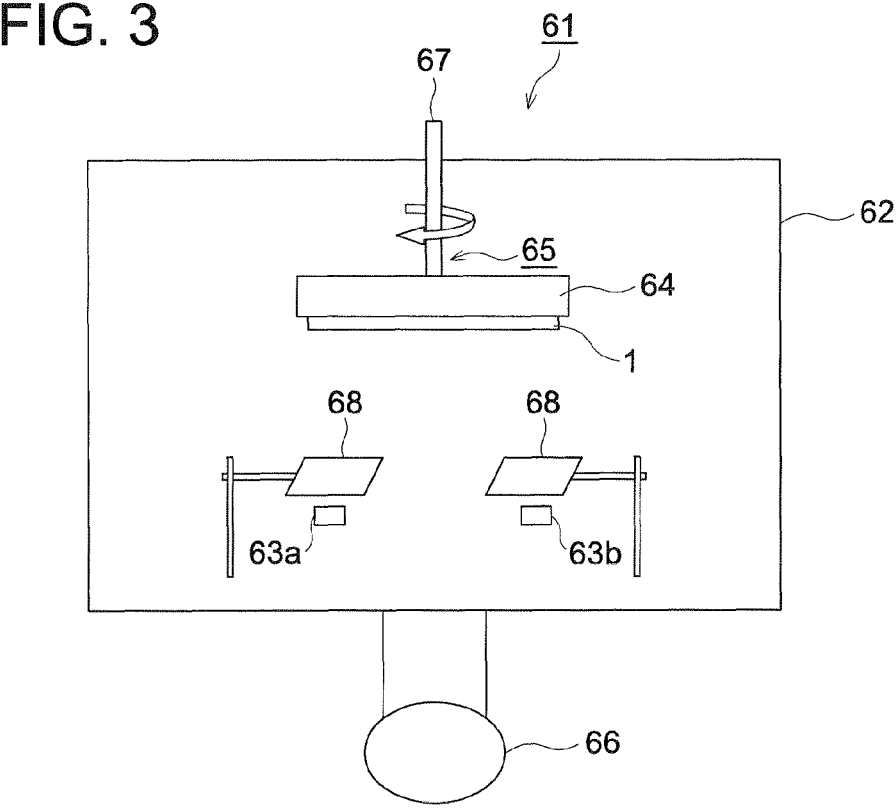
FIG. 3 shows a schematic constitution of a vapor deposition device (1).

Preparation Method of Radiation Scintillator:

A typical example of a method of preparing the radiation scintillator of the invention will be described with reference to drawings. FIG. 1 illustrates a sectional view showing a constitution of a radiation scintillator 10. FIG. 2 illustrates an enlarged sectional view showing a part of the radiation scintillator 10. FIG. 3 shows a schematic constitution of a vapor deposition device 1.

Vapor Deposition Device:

In the following, a vapor deposition device is described with reference to FIG. 3. As illustrated in FIG. 3, a vapor deposition device 61 of a radiation scintillator is provided with a vacuum vessel 62. The vacuum vessel 62 is provided with a vacuum pump 66 to evacuate the inside of the vacuum vessel 62 and to introduce atmosphere.

A holder to support a substrate 1 is provided near the upper surface within the vacuum vessel 62.

The substrate 1 can optionally be chosen from material known as a substrate of a conventional radiation scintillator, but as the substrate 1 of the embodiments of the invention is preferably a quartz glass sheet, a metal sheet selected from aluminum, iron, tin and chromium or a carbon fiber reinforced sheet.

The substrate 1 may be provided with a resin layer to smoothen the surface. The resin layer preferably contains a polyimide, polyethylene terephthalate, paraffin, or graphite and the thickness preferably is approximately 5 to 50 μm. The resin layer may be provided on the surface of the substrate 1 or the back face thereof.

Means to provide a resin layer on the surface of the substrate 1 include, for example, an adhesion method, coating method or the like. Of these, the adhesion method is carried out by using a heated pressure roller, preferably under the heating condition of approximately 80 to 150° C. and the pressure condition of 4.90×10 to 2.94×10$^2$ N/cm at a conveyance rate of 0.1 to 2.0 m/s.

A phosphor layer is formed on the surface of the substrate 1 by a process of gas phase deposition. The process of gas phase deposition may employ a vapor deposition method, a sputtering method, a CVD method, an ion-plating method or the like, of which the vapor deposition method is preferred in the invention.

A holder 64 supports the substrate 1 so that the substrate surface to form the phosphor layer is opposed to and is also parallel to the bottom surface of the vacuum vessel 62.

The holder 64 is preferably provided with a heater (which is not shown in the drawing) to heat the substrate 1. Heating the substrate by the heater achieves enhanced contact of the substrate to the holder 64 and controls layer quality of the phosphor layer. Further, adsorbate on the surface of the substrate 1 is also eliminated or removed to inhibit generation of an impurity layer between the surface of the substrate 1 and a phosphor described later.

Further, there may be provided, as a heating means, a mechanism (not shown in the drawing) to circulate a warming medium or heating medium. Such a means is suitable when performing vapor deposition with maintaining the substrate at a relatively low temperature of 50 to 150° C.

There may be provided a halogen lamp (not shown in the drawing) as a heating means. This means is suitable when performing vapor deposition with maintaining the substrate at a relatively high temperature of not less than 150° C.

The holder 64 is provided with a rotation mechanism 65 to rotate the substrate 1 in the horizontal direction. The rotation mechanism 65 is constituted of a support rotation shaft 67 to rotating the substrate 1 with supporting the holder 64 and a motor (not shown in the drawing) which is disposed outside the vacuum vessel and is a driving source of the support rotation shaft 67.

In the vicinity of the bottom surface within the vacuum vessel 62, evaporation sources 63a and 63b are disposed at positions opposed to each other on the circumference of a circle centered on a center line vertical to the substrate 1. In that case, the distance between the substrate 1 and the evaporation source 63a or 63b is preferably from 100 to 1500 mm, and more preferably from 200 to 1000 mm. Further, the distance the center line vertical to the substrate 1 and the evaporation source 63a or 63b is preferably from 100 to 1500 mm, and more preferably from 200 to 1000 mm.

The radiation scintillator production apparatus may be provided with three or more evaporation sources, in which the individual evaporation sources may be disposed at equivalent intervals or different intervals. The radius of a circle centered on a center line vertical to the substrate 1 can arbitrarily be set. In the invention, plural evaporation sources are disposed on the circumference of a circle and it is preferred to dispose an evaporation source also on the central portion of the circle. Disposing an evaporation source on the central portion of the circle enables to reduce variation in thickness of a deposited layer over the entire panel surface, even when used for a large size panel such as FDP, leading to an improvement of unevenness of sensitivity.

The evaporation sources 63a, and 63b, which house a phosphor and heat it by a resistance heating method, may be constituted of an alumina crucible wound by a heater, a boat or a heater of a metal with a high melting point. Methods of heating a phosphor include heating by an electron beam and high-frequency induction healing, but in the invention, a method of resistance-heating by direct current or a method of resistance-heating indirectly a crucible by a circumferential heater is preferable in terms of ease of operation by a relatively simple constitution and low price and also being applicable to many substances. The evaporation sources 63a, and 63b may be a molecular beam by a molecular source epitaxial method.

A shutter which is openable in the horizontal direction is provided between the evaporation source 63a or 63b and the substrate 1 to intercept the space from the evaporation source 63a or 63b to the substrate 1; this shutter prevents substances except the objective material which were attached to the phosphor surface and have been evaporated at the initial stage of vapor deposition from adhering onto the substrate 1.

Next, there will be described a production method of a radiation scintillator of the invention by using the foregoing vapor deposition device 61 of a radiation scintillator.

First, the substrate 1 is placed onto the holder 64. Further, evaporation sources 64a and 64b are disposed on the circumference of a circle centered on a center line vertical to the substrate 1. In that case, the space between the substrate 1 and the evaporation source 63a or 63b is preferably from 100 to 1500 mm, and more preferably from 200 to 1000 mm. The space between the center line vertical to the substrate 1 is preferably from 100 to 1500 mm, and more preferably from 200 to 1000 mm.

Subsequently, the inside of the vacuum vessel 62 is evacuated to control the evacuation degree to the desired level. Thereafter, the holder 64 is rotated to the evaporation sources 63a and 63b by the rotation mechanism 65. When the vacuum vessel 62 reaches a vacuum degree capable of performing vapor deposition, phosphor is evaporated from the heated evaporation sources 63a and 63b, whereby the phosphor is grown to a desired thickness on the surface of the substrate 1.

The process of growing a phosphor on the surface of the substrate 1 may be divided to plural steps to form a phosphor layer.

In the vapor deposition method, a material subject to deposition (the substrate 1, protective layer or intermediate layer) may appropriately be heated or cooled during vapor deposition.

After completing vapor deposition, the phosphor layer may be subjected to a heating treatment. There may be also conducted a reactive deposition in which deposition is performed, while introducing gas such as $O_2$ or $H_2$.

The thickness of the formed phosphor layer, which is different depending on intended use or the kind of a phosphor, is from 50 to 2000 µm, preferably 50 to 1000 µm, and more preferably from 100 to 800 µm.

The temperature of the substrate 1 on which a phosphor layer is to be formed, is set preferably to the range of room temperature (rt) to 300° C., and more preferably 50 to 250° C.

After forming the phosphor layer, a protective layer to physically or chemically protect the phosphor layer may be provided on the phosphor layer opposite to the substrate 1. A coating solution for a protective layer may be directly coated onto the phosphor layer surface or a protective layer which was previously formed may be adhered to the phosphor layer. The thickness of such a protective layer is preferably from 0.1 µm to 2000 µm.

Alternatively, a protective layer may be formed by depositing SiC, $SiO_2$, SiN or $Al_2O_3$ through a vapor deposition method, sputtering method or the like.

In the vapor deposition device 61 for a radiation scintillator or the production method thereof, plural evaporation sources are provided, whereby the overlapping portion of vapor streams from evaporation sources 63a and 63b are straightened, resulting in uniform crystallinity of a phosphor deposited on the surface of the substrate 1. In that case, more evaporation sources are provided, vapor streams are straightened at a larger number of portions, resulting in uniform crystallinity over a broader region. Further, when evaporation sources 64a and 64b are disposed on the circumference of a circle centered on a center line vertical to the substrate 1, such an action of unifomalizing crystallinity by straightening vapor streams can be isotropically achieved on the surface of the substrate 1.

Further, performing deposition of a phosphor with rotating the substrate 1 by the rotation mechanism 65 can achieve uniform deposition of the phosphor on the surface of the substrate 1.

Radiation Scintillator:

Next, there will be described a method of preparing a radiation scintillator panel 10.

In the preparation method of the scintillator panel 10, the above-described vapor deposition device 61 is suitably usable. There will be described a method of preparing the radiation scintillator 10 by use of the vapor deposition device 61.

Formation of Intermediate Layer:

An intermediate layer 2 can be formed on one side of the by extrusion coating. There may optionally be added a matting agent or a filler to control the surface property or Young modulus of the intermediate layer.

Formation of Reflection Layer:

A reflection layer 3 of a thin metal layer (Al layer, Ag layer, or the like) is formed on the surface of the substrate provided with the intermediate layer 2. Films in which such Al membrane is deposited on a polymer film by sputtering are commercially available and these are also usable.

Formation of Protective Layer:

A protective layer 4 is formed by coating the composition of a colorant and an organic resin, dispersed/dissolved in an organic solvent.

Formation of Scintillator Layer:

First, the substrate 1 which was provided with the intermediate layer 2, the reflection layer 3 and the protective layer 4 is placed onto the holder 64, and a powdery mixture of cesium iodide and thallium iodide are filled in the evaporation source 63. The spacing between the evaporation source 63 and the substrate 1 set to be within the range of 100 to 1500 mm and it is preferred to perform the vapor deposition process described later, while maintaining the set value falling within foregoing range.

After completing the preliminary step, a vacuum pump is operated to evacuate the interior of the vacuum vessel 62 to form a vacuum atmosphere of not more than 0.1 Pa in the interior of the vacuum vessel (vacuum atmosphere forming step). Herein, the vacuum atmosphere represents an atmosphere under a pressure of not more than 100 Pa, and an atmosphere under a pressure of not more than 0.1 Pa is suitable.

Thereafter, inert gas such as argon or the like is introduced into the vacuum vessel 62 and the interior of the vacuum vessel 62 is maintained under a vacuum atmosphere of 0.1 Pa to 5 Pa. Thereafter, the heater of the holder 64 and the rotation mechanism 65 are driven and the substrate 1 placed onto the holder 64 which is rotated with being opposed to the evaporation source and heated.

In such a state, an electric current is flown from an electrode to the evaporation source 63 and a mixture including cesium iodide and thallium iodide is heated to a temperature of 700 to 800° C. over a prescribed time to evaporate the mixture.

As a result, a large number of columnar crystals 5a sequentially grow to form a scintillator layer with an intended thickness (vapor deposition step). Thereby, the scintillator layer 10 of the invention can be produced.

The temperature to heat the evaporation source is preferably from 500 to 800° C., and more preferably from 630 to 750° C. The substrate temperature is preferably from 100 to 250° C., and more preferably from 150 to 250° C. A substrate temperature falling within this range leads to formation of columnar crystals with a excellent form, leading to a enhanced luminance characteristic.

Formation of Moisture-resistant Protective Layer:

A moisture-resistant protective layer 6 is formed preferably by coating a composition of an organic resin dispersed/ dissolved in an organic solvent on a scintillator layer, followed by being dried. The composition may contain a colorant or a matting agent. The scintillator layer may be sealed with a sealing film which is formed by coating a composition dispersing/dissolving an organic resin on a support (PET, PEN, aramid or the like).

Figure 4:
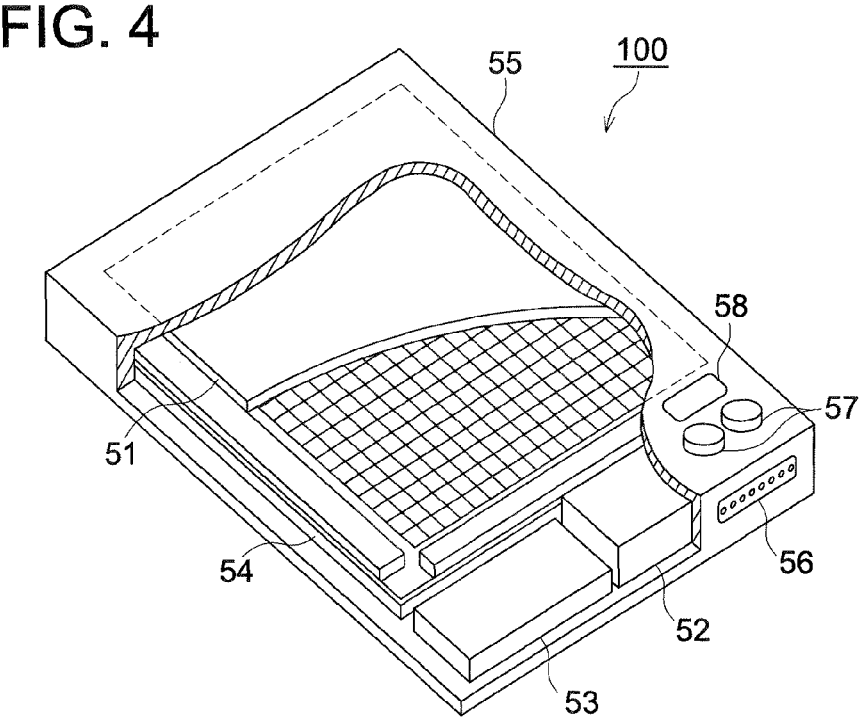
FIG. 4 illustrates a partially fractured perspective view showing a constitution of a radiation image detector (100).
Figure 5:
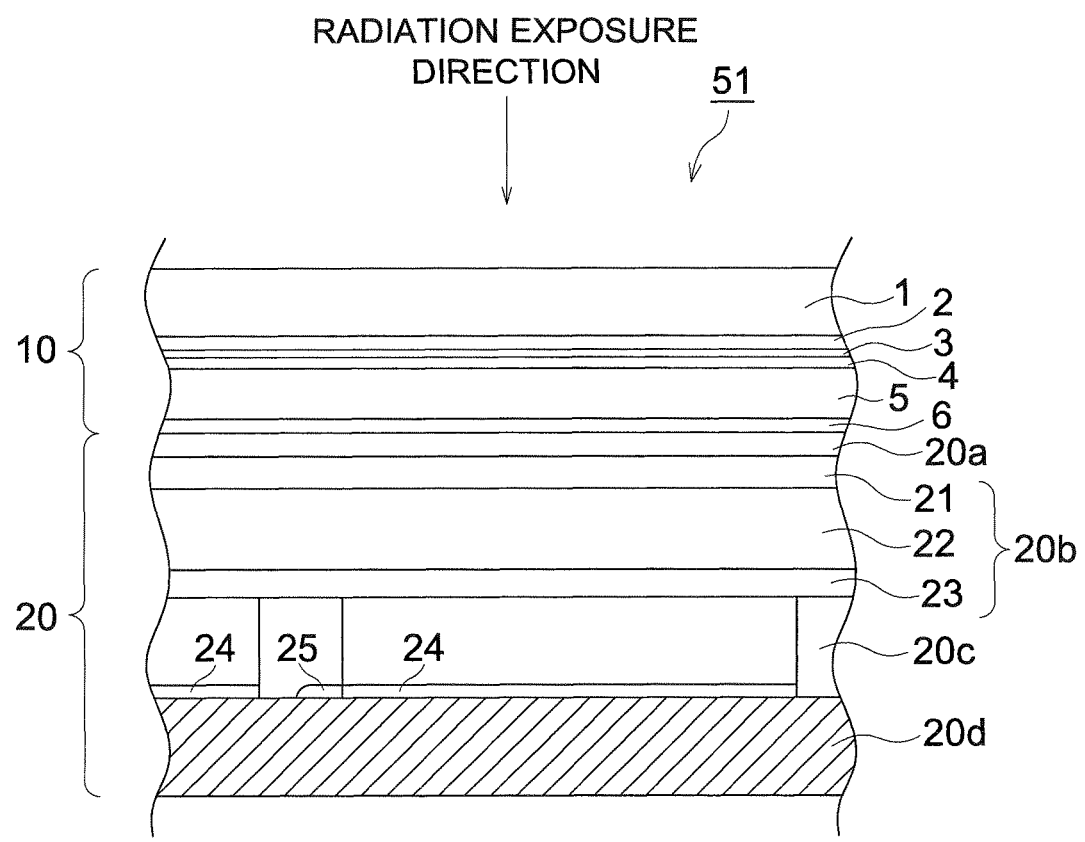
FIG. 5 illustrates an enlarged sectional view of an imaging panel (51).

Radiation Image Detector:

In the following, there will be described constitution of a radiation image detector 100 provided with the scintillator plate 10 as an application example of the radiation scintillator 10 with reference to FIGS. 4 and 5. FIG. 4 illustrates a partially fractured perspective view showing a constitution of a radiation image detector 100. FIG. 5 illustrates an enlarged sectional view of an imaging panel 51.

In the radiation image detector 100, as shown in FIG. 4, an imaging panel 51, a control section 52 to control movement of the radiation image detector 100, a memory section 53 to memorize image signals outputted from the imaging panel 51 by using rewritable dedicated memory (e.g., flash memory), and a power source section 54 of a power supplier to supply a power necessary to obtain image signals by driving the imaging panel 51 are provided in the interior of a housing 55. The housing 55 is provided with a connector 56 for communication to communicate from the radiation image detector 100 to the exterior if needed, an operation section 57 to change motion of the radiation image detector 100, a display section 58 to show completion of preparation for picture-taking or writing-in of an prescribed amount of image signals to a memory section 53, and the like.

Herein, if the radiation image detector 100 is provided with the memory section 53 to memorize image signals of a radiation image together with the power source section 54 and is designated to be detachable through the connector 56, the radiation image detector 100 can become a portable structure.

As shown in FIG. 5, an image panel 51 is constituted of a radiation scintillator 10 and an output substrate 20 to absorb electromagnetic waves from the radiation scintillator 10 and output image signals.

The radiation scintillator 10 is disposed on the side of the radiation-exposed surface and is constituted so as to emit an electromagnetic wave in accordance with the intensity of incident radiation.

An output substrate 20 is provided on the opposite surface of the radiation-exposed surface of the radiation scintillator 10, and a diaphragm 20a, a photoelectric conversion element 20b, an image signal output layer 20c and the substrate 20d are sequentially provided from the side of the radiation scintillator 10.

The diaphragm 20a is provided to separate the radiation scintillator 10 from other layers.

The photoelectric conversion element 20b is constituted of a transparent electrode 21, a charge generation layer 22 which generates a charge upon excitation by electromagnetic waves transmitted through the transparent electrode 21 and a counter electrode 23 opposed to the transparent electrode 21; and the transparent electrode 21, the charge generation layer 22 and the counter electrode 23 are sequentially arranged from the diaphragm 20a side.

The transparent electrode 21 is an electrode capable of transmitting electromagnetic waves to be photoelectrically converted and is formed by using, for example, an electrically conductive transparent material such as indium tin oxide (ITO), $SnO_2$ or ZnO.

The charge generation layer 22 is formed in a thin layer form on one surface side of the transparent electrode 21 and contains an organic compound capable of performing charge separation through light, as a photoelectric-convertible compound, and containing an electron donor capable of generating a charge and an electrically conductive compound as an electron acceptor, respectively. In the charge generation layer 22, the electron donor is excited upon incidence of an electromagnetic wave and releases an electron, and the released electron is transferred to the electron acceptor so that a charge, that is, carriers of a hole and an electron are generated in the charge generation layer.

Electrically conductive compounds as an electron donor include a p-type conductive polymer compound. A p-type conductive polymer compound preferably is a compound having a basic backbone of polyphenylene-vinylene, polythiophene, poly(thiophenevinylene), polyacetylene, polypyrrole, polyfluorene, poly(p-phenylene) or polyaniline.

Electrically conductive compounds as an electron acceptor include an n-type conductive polymer compound. An n-type conductive polymer compound preferably is a compound having a basic backbone of polypyridine, and more preferably a backbone of poly(p-pyridylvinylene).

The thickness of the charge generation layer 22 is preferably not less than 10 nm (and more preferably, not less than 100 nm) to secure a light absorption amount, and is preferably not more than 1 μm (and more preferably, not more than 300 nm) from the point of view that electrical resistance is not excessively large.

The counter electrode 23 is disposed on the opposite side of the side of the surface where electromagnetic waves of the charge generation layer 22 enter. The counter electrode 23 may employ by selecting one from conventional metal electrode such as gold, silver, aluminum and chromium, and the transparent electrode 21; however, to achieve superior characteristics, it is preferred to employ, as an electrode material, one of a metal, alloy, and electrically conductive compound which are low in work function (4.5 eV or less), and their mixture.

Between the respective electrodes sandwiching the charge generation layer 22, that is, transparent electrode 21 and counter electrode 23, there may be provided a buffer layer which acts as a buffer zone so that the charge generation layer 22 is not reacted with these electrodes. The buffer layer is formed by use of for example, lithium fluoride, poly(3,4-ethylenedioxythiophene:poly(4-styrenesulfonate), or 2,9-dimethyl-4,7-diphenyl[1,10]-phenathroline.

The image signal output layer 20c accumulates a charge obtained in the photoelectric conversion element 20b and outputs signals based on the accumulated charge and is constituted of a condenser 24 as a charge accumulating device to accumulate a charge produced in the photoelectric conversion element 20b for the respective picture elements and a transistor 25 as an image signal output element to output the accumulated charge as a signal.

The transistor 25 uses, for example, TFT (Thin Film Transistor). The TFT may be one employing an inorganic semiconductor which is employed in a liquid crystal display or one employing an organic semiconductor, and preferably a TFT formed on plastic film. There is known amorphous silicon as a TFT formed on plastic film. Further, TFT may be formed on a flexible plastic film by FSA (Fluidic Self Assembly) technique, that is, by arraying minute CMOS (Nanoblocks) made of a single crystal silicon on an embossed plastic film. It may be a TFT by use of an organic semiconductor, as described in the relevant literature, Science, 283, 822 (1999); Appl. Phys. Lett. 771488 (1998); and Nature, 403, 521 (2000).

The transistor 25 preferably is a TFT prepared by the foregoing FSA technique or a TFT by use of an organic semiconductor and the TFT by use of an organic semiconductor is specifically preferred. When constituting a TFT by use of such an organic semiconductor, installations such as a vacuum deposition device which is used in preparation of TFT by use of silicon are not required and a TFT can be formed by utilizing a printing technique or an ink jet technique, leading to reduction of production cost. Further, a lowering of processing temperature renders it feasible to form a TFT on a heat-sensitive plastic substrate.

The transistor 25 accumulates an electric charge generated in the photoelectric conversion element 20b and is also connected to a collection electrode (not shown in the drawing) as one electrode of the condenser 24. Electric charge produced in the photoelectric conversion element 24 is accumulated in the condenser 24 and the accumulated charge is read by driving the transistor 25. Namely, driving the transistor 25 can allow a signal for each pixel to be outputted.

The substrate 20d functions as a support of the image panel 51 and can be constituted of the same material as the substrate 1.

Next, there will be described action of a radiation image detector 100.

First, radiation which has entered the radiation image detector 100 enters from the radiation scintillator 10 side toward the substrate 20d side.

When radiation has entered the scintillator 10, a scintillator layer 5 of the scintillator 10 absorbs the radiation energy, and emits electromagnetic waves corresponding to its intensity. Of emitted electromagnetic waves, electromagnetic waves which have entered the output substrate 20 penetrate the diaphragm 20a and the transparent electrode 21 and reach the charge generation layer 22. Then, the electromagnetic waves are absorbed in the charge generation layer 22 and form pairs of positive hole and electron (charge separation state) in response to its intensity.

Then, positive holes and electrons are respectively conveyed to different electrodes (transparent electrode membrane and conductive layer, so that e a photoelectric current flows.

Thereafter, positive holes conveyed to the counter electrode 23 side are accumulated in the condenser 24. The accumulated positive holes output image signals by driving the transistor 25 connected to the condenser 24 and the outputted image signals are stored in the memory section 53.

EXAMPLES

The present invention will be further described with reference to examples but the invention is by no means limited to these.

Example 1

Preparation of Reflection Layer:

Aluminum was sputtered onto a 125 μm thick polyimide film (UPILEX-125S, made by Ube Kosan Co., Ltd.) to form a (0.02 μm thick) reflection layer.

Preparation of Protective Layer:

| | |
|---|---|
| Vylon 200 (made by TOYOBO Co., Ltd., polyester resin, Tg: 67° C.) | 100 parts by mass |
| Hexamethylene diisocyanates | 3 parts by mass |
| Phthalocyanine Blue | 0.1 part by mass |
| Methyl ethyl ketone (MEK) | 100 parts by mass |
| Toluene | 100 parts by mass |

The foregoing composition was mixed and dispersed by a bead mill over 15 hours to obtain a coating solution for a protective layer.

The coating solution was coated by an extrusion coater on the aluminum reflection layer surface of the foregoing film substrate so that the dry thickness was 2.5 μm.

Formation of Scintillator Layer:

The foregoing support provided with a reflection layer and a protective layer was placed on a support holder installed with a support rotation mechanism. Subsequently, the aforedescribed phosphor raw material including cesium iodide and thallium iodide was placed in an evaporation source crucibles, as an evaporation material and eight evaporation source crucibles were arranged on the circumference of a circle centered on a center line vertical to the support. In such case, the distance between the support and the evaporation source was adjusted to 450 mm and the distance between the center line vertical to the support and the evaporation source was adjusted to 300 mm. Further, eight shielding plates was arranged on the line connecting the evaporation source and the center point of the surface of the support, opposing to the evaporation source at a height or a position so that the upper end portions of the shielding plates are in contact with each other, whereby the range of an entrance angle at the time when the phosphor deposits onto the support was limited. Then, four evaporation source crucibles were disposed near the bottom within the vacuum vessel and on the circumference of a circle centered on a center line vertical to the support. In that case, the distance between the support and the evaporation source was adjusted to 450 mm and the distance between the center line vertical to the support and the evaporation source was also adjusted to 150 mm. Further, one evaporation source crucible was disposed near the bottom within the vacuum vessel and on the center of a circle centered on a center line vertical to the support. The internal portion of the vacuum vessel was evacuated, and then Ar gas was introduced and adjusted to a vacuum degree of 0.02 Pa, thereafter, the temperature of the support was maintained at 50° C., while rotating the support at a rate of 10 rpm. Subsequently, the inside of the crucible was raised to a prescribed temperature by resistance heating to initiate vapor deposition of a phosphor and then the substrate temperature was raised to 200° C. and vapor deposition was terminated when the thickness of the phosphor layer reached 450 μm.

Then, the phosphor layer was sealed by a protective layer which was formed previously by laminating $Al_2O_3$ through a sputtering method so that the phosphor layer was covered with the protective layer, whereby a radiation scintillator sample 101 with a structure of the phosphor layer being sealed was obtained.

Samples 102-108 and 113-120:

Samples were prepared in the same manner as the foregoing Sample 101, except that vacuum degree or substrate temperature during vapor deposition, or thickness or filling factor of a scintillator layer was varied, as shown in Table 1.

Samples 109 and 110:

Samples 109 and 110 were prepared in the same manner as the foregoing Samples 102 and 107, respectively, except that four evaporation source crucibles which were disposed on the circumference of the circle at a distance of 150 mm between the center line vertical to the support and an evaporation source were not used.

Samples 111 and 112:

Samples 111 and 112 were prepared in the same manner as the foregoing Samples 102 and 107, respectively, except that four evaporation source crucibles which were disposed on the circumference of the circle at a distance of 150 mm between the center line vertical to the support and the evaporation source were not used and a single evaporation source crucible which was disposed at the center of the circle centered on the center line vertical to the support was also not used.

Samples 121 and 122:

Samples 121 and 122 were prepared in the same manner as the foregoing Samples 102 and 107, respectively, except that there were not used the eight evaporation source crucibles which were disposed on the circumference of the circle at a distance of 300 mm between the center line vertical to the support and the evaporation source and there were also not used the four evaporation source crucibles which were disposed on the circumference of the circle at a distance of 150 mm between the center line vertical to the support and the evaporation source.

Evaluation

Layer Thickness Distribution:

The layer thickness distribution was determined in the manner that a radiation scintillator is vertically and horizontally divided equally into ten parts and the resultant 100 portions were measured with respect to thickness at the center of the individual portion, and from the obtained the maximum thickness ($D_{max}$) and the minimum thickness ($D_{min}$), the layer thickness distribution was calculated based on the equation (1) described earlier.

Coefficient of Variation:

The layer thickness distribution was determined in the manner that a radiation scintillator is vertically and horizontally divided equally into ten parts and the resultant 100 portions were measured with respect to thickness at the center of the individual portions, and an average layer thickness ($D_{av}$) of the respective measurement points (average value of measurements of five times) and a standard deviation of the average layer thickness ($D_{dev}$) were calculated based on the equation (2) described earlier.

The foregoing radiation scintillators were each set into a Pax Scan 2520 (FPD, made by Varian Co.) to prepare a radiation image detector and evaluated with respect to sensitivity uniformity, shock resistance, sharpness and luminance in the manner described below.

Evaluation of Shock Resistance:

After a 500 g iron ball was allowed to fall to a radiation image detector from a height of 20 cm, the radiation image detector was visually observed and evaluated. Thereafter, after being exposed to X-rays at a tube voltage of 80 kVp, an obtained image on a fiat panel detector (FDP) was printed out by an output device and the obtained print image was visually evaluated with respect to shock resistance, based on the following criteria. Evaluation results are shown in Table 1. Evaluation was made for every 0.5 rank.
- 5: No cracking was observed and a uniform image was obtained,
- 4: No cracking was observed and image quality was at a level of being little noticed,
- 3: Cracking was observed and a slight image defect was confirmed, which was at a level of being acceptable in practice,
- 2: Cracking was observed and an apparent image defect was confirmed
- 1: A large number of cracks was observed and many image defects were noted, which was at a level to cause problems in practice.

Evaluation of Sharpness:

Similarly to the foregoing evaluation of graininess, the FPD was exposed to X-rays at a tube voltage of 70 kVp through a lead MTF chart and the image data was recorded on a hard disc. Then, the record on the hard disc was analyzed by a computer to determine a modulation transfer function, MTF [MTF value (%) at a spatial frequency cycle of 1/mm], which was a measure of sharpness. A higher MTF value indicates superior sharpness. "MTF" is the abbreviation for Modulation Transfer Function.

Evaluation of Luminance:

Samples were each exposed to X-rays at a voltage of 80 kVp from the back surface (not forming a scintillator layer and the image data were detected by the FDP disposed with the scintillator, and the average signal value of the image was defined as emission luminance.

TABLE 1

| Sample No. | Vacuum Degree During Deposition (Pa) | Substrate Temperature (° C.) | Scintillator Layer Thickness (µm) | Filling Factor | Layer Thickness Distribution (%) | Coefficient of Variation of Layer Thickness (%) | Luminance (Relative Value) | Sharpness (Relative Value) | Durability (Shock Resistance) | Remark |
|---|---|---|---|---|---|---|---|---|---|---|
| 101 | 0.02 | 250 | 450 | 90 | 4 | 3 | 100 | 100 | 5.0 | Inv. |
| 102 | 0.1 | 200 | 450 | 85 | 4 | 3 | 99 | 102 | 5.0 | Inv. |
| 103 | 0.2 | 150 | 450 | 80 | 4 | 3 | 98 | 104 | 5.0 | Inv. |
| 104 | 0.5 | 100 | 450 | 75 | 4 | 3 | 97 | 105 | 5.0 | Inv. |
| 105 | 0.01 | 270 | 150 | 90 | 5 | 4 | 98 | 104 | 5.0 | Inv. |
| 106 | 0.02 | 250 | 150 | 85 | 5 | 4 | 97 | 106 | 5.0 | Inv. |
| 107 | 0.1 | 200 | 150 | 80 | 5 | 4 | 96 | 108 | 5.0 | Inv. |
| 108 | 0.2 | 150 | 150 | 75 | 5 | 4 | 95 | 109 | 5.0 | Inv. |
| 109 | 0.1 | 200 | 450 | 85 | 10 | 9 | 98 | 101 | 4.5 | Inv. |
| 110 | 0.1 | 200 | 150 | 80 | 10 | 9 | 96 | 103 | 4.5 | Inv. |
| 111 | 0.1 | 200 | 450 | 85 | 20 | 20 | 96 | 100 | 4.0 | Inv. |
| 112 | 0.1 | 200 | 150 | 80 | 20 | 20 | 94 | 101 | 4.0 | Inv. |
| 113 | 0.1 | 200 | 500 | 87 | 4 | 3 | 100 | 101 | 5.0 | Inv. |
| 114 | 0.1 | 200 | 100 | 77 | 5 | 4 | 95 | 109 | 4.5 | Inv. |
| 115 | 0.1 | 200 | 540 | 89 | 4 | 3 | 100 | 83 | 5.0 | Comp. |
| 116 | 0.1 | 200 | 80 | 75 | 5 | 4 | 81 | 110 | 3.0 | Comp. |
| 117 | 0.7 | 100 | 450 | 72 | 4 | 3 | 84 | 103 | 3.5 | Comp. |
| 118 | 0.5 | 100 | 150 | 72 | 5 | 4 | 83 | 109 | 3.0 | Comp. |
| 119 | 0.01 | 250 | 450 | 93 | 4 | 3 | 100 | 85 | 3.5 | Comp. |
| 120 | 0.005 | 270 | 150 | 93 | 5 | 4 | 99 | 88 | 3.5 | Comp. |
| 121 | 0.1 | 200 | 450 | 85 | 24 | 23 | 93 | 94 | 2.0 | Comp. |
| 122 | 0.1 | 200 | 150 | 80 | 25 | 24 | 91 | 96 | 2.0 | Comp. |

As is apparent from Table 1, it was proved that a radiation scintillator of the invention and a radiation image detector by use of the radiation scintillator were little deterioration in luminance and sharpness and superior in shock resistance.

Example 2

On a photoelectric conversion panel provided with a photodiode and a TFT device, a scintillator layer which was the same as the scintillator layer used in each of the foregoing samples 101 to 122 was formed by a vapor deposition method through a protective layer, and then sealed with a sealing film in which aluminum was overall vapor-deposited, whereby a radiation image detector was prepared. Even in the case of the thus prepared radiation image detectors, it was confirmed that, similarly to Example 1, radiation image detectors which were little deterioration in luminance and sharpness and superior in shock resistance were obtained by allowing the layer thickness, filling factor, layer thickness distribution and layer thickness of the scintillator layer to fall within the range of the invention.

What is claimed is:

1. A radiation scintillator, wherein the radiation scintillator comprises, on a substrate, a scintillator layer containing a phosphor and formed by a process of gas phase deposition, and the scintillator layer exhibits a thickness of 120 to 470 μm, a filling factor of the phosphor of 75 to 90% by mass and a layer thickness distribution of not more than 20%.

2. The radiation scintillator as claimed in claim 1, wherein the phosphor is a cesium halide phosphor.

3. The radiation scintillator as claimed in claim 1, wherein the phosphor contains a thallium as an activator.

4. A radiation scintillator, wherein the radiation scintillator comprises, on a substrate, a scintillator layer containing a phosphor and formed by a process of gas phase deposition, and the scintillator layer exhibits a thickness of 120 to 470 μm, a filling factor of the phosphor of 75 to 90% by mass and a coefficient of variation of thicknesses of not more than 20%.

5. The radiation scintillator as claimed in claim 4, wherein the phosphor is a cesium halide phosphor.

6. The radiation scintillator as claimed in claim 4, wherein the phosphor contains a thallium as an activator.

7. A radiation image detector comprising an input means for converting a radiation to a visible light by a radiation scintillator and an output means for outputting image information based on the visible light converted by the radiation scintillator, wherein the radiation scintillator comprises, on a substrate, a scintillator layer containing a phosphor and formed by a process of gas phase deposition, and the scintillator layer exhibits a thickness of 120 to 470 μm, a filling factor of the phosphor of 75 to 90% by mass and a layer thickness distribution of not more than 20%.

8. A radiation image detector comprising an input means for converting a radiation to a visible light by a radiation scintillator and an output means for outputting image information based on the visible light converted by the radiation scintillator, wherein the radiation scintillator comprises, on a substrate, a scintillator layer containing a phosphor and formed by a process of gas phase deposition, and the scintillator layer exhibits a thickness of 120 to 470 μm, a filling factor of the phosphor of 75 to 90% by mass and a coefficient of variation of thicknesses of not more than 20%.

9. A method of producing a radiation scintillator comprising on a substrate a scintillator layer containing a phosphor, the method comprising:
    depositing a phosphor on the substrate to form the scintillator layer,
    wherein the scintillator layer exhibits a thickness of 120 to 470 μm, a filling factor of the phosphor of 75 to 90% by mass and a layer thickness distribution of not more than 20%.

10. The method as claimed in claim 9, wherein the phosphor is a cesium halide phosphor.

11. The method as claimed in claim 10, wherein the phosphor contains a thallium as an activator.

12. A method of producing a radiation scintillator comprising on a substrate a scintillator layer containing a phosphor, the method comprising:
    depositing a phosphor on the substrate to form the scintillator layer,
    wherein the scintillator layer exhibits a thickness of 120 to 470 μm, a filling factor of the phosphor of 75 to 90% by mass and a coefficient of variation of thicknesses of not more than 20%.

13. The method as claimed in claim 12, wherein the phosphor is a cesium halide phosphor.

14. The method as claimed in claim 12, wherein the phosphor contains a thallium as an activator.

* * * * *